2,726,991

HYDROCARBON DESULFURIZATION PROCESS WITH CALCINED REACTION PRODUCT OF TITANIUM HALIDE AND PHOSPHORIC ACID

Wilford J. Zimmerschied, Crown Point, Ind., and Harold Shalit, Drexel Hill, Pa., assignors to Standard Oil Company, Chicago, Ill., a corporation of Indiana No Drawing. Application December 1, 1952,
Serial No. 323,520

10 Claims. (Cl. 196—28)

The present invention relates to the catalytic desulfurization of sulfur-containing hydrocarbon stocks. More particularly, the invention relates to the desulfurization of sulfur-containing petroleum fractions by contact with an improved catalyst consisting essentially of a reaction product of a titanium halide and a phosphoric acid, or an oxide-promoted modification thereof.

Titanium chlorides and bromides, like catalysts of the Friedel-Crafts type (e. g., aluminum chloride), are excessively active in promoting various types of reactions for which they are otherwise satisfactory catalysts. It is therefore advantageous to subject the titanium halides to some form of physical or chemical treatment capable of moderating their excessive catalytic activity. Such a treatment is described in the copending application Serial No. 323,517 of Harold Shalit and Arthur P. Lien, filed December 1, 1952, wherein a titanium halide is commingled and heated with a phosphoric acid at a temperature above about 175° C. until the evolution of hydrogen halide substantially ceases. Catalysts of greatly improved properties are obtained thereby, effective in a wide range of hydrocarbon-conversion reactions. Catalysts of further improved properties have been obtained by heating a titanium halide and a phosphoric acid according to the above procedure in the presence of a group V or VI metallic oxide having hydrogenation-dehydrogenation properties, as described in the copending application Serial No. 323,518 of Harold Shalit and Arthur P. Lien, filed December 1, 1952.

We have now discovered that titanium halide-phosphoric acid catalysts are effective in the desulfurization of sulfur-containing hydrocarbon stocks, such as petroleum fractions, producing a higher degree of sulfur removal with less gas production, coke deposition, and other side reactions than catalysts conventionally employed for this purpose. We have further discovered that strikingly superior results are obtained in the desulfurization of such charging stocks by treatment thereof with the oxide-promoted titanium halide-phosphoric acid catalysts.

One object of our invention is to improve the desulfurization of sulfur-containing hydrocarbon stocks. Another object is to effect desulfurization of petroleum fractions with a minimum of side reactions. A further object is to effect desulfurization of petroleum stocks in a more nearly continuous manner, with a minimum of lost time for catalyst reactivation or replacement.

A convenient method of preparing a catalyst of the group employed in our new process is to commingle a suitable titanium halide with a suitable phosphoric acid in a stirred vessel, and then warm the mixture to such a temperature that hydrogen halide is evolved smoothly in a steady stream. The reaction begins at ordinary temperatures, and proceeds rapidly at 60 to 100° C. As hydrogen halide evolution slows down, the temperature is raised gradually or stepwise to a maximum of 175° C. or above, preferably between about 175 and 250° C., optimally around 200° C., where it is maintained until hydrogen halide evolution has approached the theoretical quantity and practically ceased. It is important to subject the reaction mixture to a temperature above about 175° C. for a sufficient length of time to effect the release of most or all of the halogen contained in the titanium halide, the most active catalysts being obtained at about 96 percent or more of the theoretical hydrogen halide evolution. Inadequate heating produces a yellow, inactive catalyst, which, however, can be converted into the gray, highly active material by a supplemental heating under the defined conditions.

A catalyst of the oxide-promoted type can be prepared by commingling a group V or group VI metallic oxide having hydrogenation-dehydrogenation properties with a phosphoric acid in a stirred vessel, adding and mixing a titanium halide therewith, and then heating the mixture as before.

An alternative procedure which may be followed is to dissolve or suspend the group V or group VI metallic oxide in the titanium halide, then to add the acid, and heat as before. As a further alternative, the titanium halide and the phosphoric acid may be commingled, and the metallic oxide may be added thereto either before or during the subsequent heating step. As a still further alternative, the reaction of titanium halide and phosphoric acid can be carried out in the presence of a substance, e. g. chromic acid, ammonium molybdate, vanadic acid, and the like, affording an oxide of the defined type under the reaction conditions employed. In general it can be said that any manipulative procedure which effects the reaction of phosphoric acid with titanium halide, optionally in the presence of a group V or group VI metallic oxide having hydrogenation-dehydrogenation properties, and which results in the evolution of substantially the theoretical proportion of hydrogen halide, will be suitable for preparing the catalyst employed in our new process.

The required catalyst can satisfactorily be prepared from titanium tetrachloride, titanium tetrabromide, and other titanium chlorides and bromides. Suitable acids include pyrophosphoric acid and orthophosphoric acid, $H_3PO_4$, the latter being preferred. As activators, we may suitably use oxides of group V or group VI metals, preferably the latter, having hydrogenation-dehydrogenation properties, such as chromia, oxides of molybdenum, vanadia, urania, tungsten oxide, and the like. The proportion of such oxide should be between about 0.5 and 20 percent by weight, preferably between about 1 and 5 percent by weight, based on anhydrous phosphoric acid. Titanium tetrachloride, for example, reacts readily with orthophosphoric acid and gives good yields of solids which vary in consistency according to the ratio of reactants. Semisolids are obtained when as little as 0.24 mole of $TiCl_4$ is allowed to react with one mole of $H_3PO_4$, while hard, dry, friable solids are obtained at a ratio of 0.38 or more. At ratios higher than about 0.7 mole per mole, the reaction product contains unreacted $TiCl_4$; such higher ratios should therefore be avoided where the presence of the free titanium halide in the reaction product is objectionable. In general, we prefer to contact titanium halide with phosphoric acid in an atomic ratio of halogen to active hydrogen between about 0.4:1 and 1:1, and we prefer to contact $TiCl_4$ with $H_3PO_4$ in a molar ratio between about 0.4:1 and 0.6:1.

The reaction proceeds more readily and gives higher yields if the phosphoric acid is anhydrous or substantially anhydrous—i. e., contains less than about 2.5 percent by weight of water.

The catalysts prepared in the described manner are stable in contact with air, and do not tend to form massive aggregates in the presence of water. Moreover, they do not ordinarily require the use of a supporting material;

if desired, however, they can be composited with kieselguhr, silica gel, silica beads, glass beads, alumina, charcoal, or other conventional supporting material, porous or nonporous and may advantageously be formed into pellets therewith.

We have found that the catalysts described above are especially effective in the removal of sulfur from petroleum fractions containing organic sulfur compounds, such as naphthas, gas oils, and the like, the desulfurization being carried out most advantageously at a temperature between about 200 and 500° C., preferably 350 to 450° C., a hydrogen pressure up to about 1500 pounds per square inch or above, preferably 200 to 1000 pounds per square inch, and a liquid hourly space velocity between about 0.5 and 4. The catalyst is conveniently employed as a powder, slurried in the charging stock, or as solid particles, pellets, or pills, in a fixed or moving bed. Numerous alternative process modifications and reactor designs will be apparent to those skilled in the art.

Our invention will be more fully understood from the following specific examples.

Example 1

Anhydrous orthophosphoric acid (151.5 grams) and titanium tetrachloride (194.5 grams) were mixed and heated at a slowly rising temperature approaching 100° C. at the end of 18 hours, then at 230° C. for approximately 4 hours. The reaction product was dried in a vacuum oven at 120° C., and was subsequently crushed and formed into ⅛-inch pellets having a crushing strength of 9.2 pounds. The completed catalyst was tested in the vapor-phase desulfurization of a West Texas virgin heavy naphtha containing 0.355 percent sulfur. The treated naphtha was collected in two fractions, which were analyzed separately, with the following results from two different tests:

| Temp., ° C. | Press., p. s. i. g. | Liquid Sp. Vel., hr.⁻¹ | Product Yield, vol.-percent | Product S, wt.-percent | Desulfurization, percent |
|---|---|---|---|---|---|
| 398 | 1,000 | 1.6 | 48 | 0.114 | 68 |
|  |  |  | 46 | 0.097 | 73 |
| 416 | 1,000 | 1.8 | 46 | 0.086 | 76 |
|  |  |  | 48 | 0.095 | 73 |

Example 2

Into a flow reactor were placed 40 milliliters (43.3 grams) of a ⅛-inch pelleted catalyst prepared by heating 103.5 grams (approximately 1 mole) of anhydrous $H_3PO_4$ with 122 grams (0.64 mole) of $TiCl_4$ to a temperature ranging from 150 to 200° C. for one hour. The reactor was heated to a temperature of 395° C. and pressured with hydrogen at 600 pounds per square inch, and through it was passed a vaporized stream of West Texas virgin naphtha (0.324 percent sulfur) at a liquid hourly space velocity of 2. A 98 volume-percent yield of liquid product containing 0.114% S was obtained, corresponding to a desulfurization of 65%.

Example 3

A solid catalyst was prepared by heating a mixture of anhydrous orthophosphoric acid (98 grams), chromium trioxide, $CrO_3$ (2 grams), and titanium tetrachloride (72.9 grams) to a temperature ranging from 150 to 200° C. until HCl evolution substantially ceased. The resulting solid was formed into ⅛-inch pellets, and 50 milliliters of the pellets were placed in a flow reactor. The reactor was heated to a temperature of 385° C. and pressured with hydrogen to 960 pounds per square inch, and through it was passed a vaporized stream of West Texas virgin naphtha at a liquid hourly space velocity of 1.2. The product was collected in two fractions, which were analyzed separately. The results were as follows:

|  | Charging Stock | Product | |
|---|---|---|---|
|  |  | Fraction 1 | Fraction 2 |
| Yield, vol. percent |  | 28 | 52 |
| Bromine No | 4.1 | 2.6 | 2.3 |
| S content, percent | 0.318 | 0.046 | 0.038 |
| Desulfurization, percent |  | 86 | 88 |

The total product yield, based on the charging stock, was 80 volume-percent.

Example 4

Over the catalyst described in Example 3 was passed a vaporous stream of coke still naphtha at a temperature of 450° C., a hydrogen pressure of 1075 pounds per square inch, and a liquid hourly space velocity of 2.3. The product was collected in two fractions, which were analyzed separately, with the following results:

|  | Charging Stock | Product | |
|---|---|---|---|
|  |  | Fraction 1 | Fraction 2 |
| Aromatics content, vol.-percent | 10.9 | 24.4 |  |
| Olefin content, vol.-percent | 37.4 | 10.3 |  |
| Bromine No | 64.1 | 32.1 | 30.0 |
| S content, percent | 0.510 | 0.267 | 0.254 |
| Yield, vol.-percent |  | 41 | 42 |
| Desulfurization, percent |  | 48 | 50 |

The observed aromatics and olefin contents of Fraction 1 indicated that extensive alkylation of aromatics had taken place.

Example 5

Orthophosphoric acid (114 grams), titanium tetrachloride (85 grams) and molybdenum trioxide, $MoO_3$ (2.3 grams), were mixed and heated to a maximum of 86° C. for 17 hours. The temperature was then raised to a maximum of 200° C. over a period of 6 hours. The reaction product was outgassed in a vacuum oven at 115° C., and was finally crushed and formed into ⅛-inch pellets. The pelleted catalyst, having a crushing strength of 5 to 7 pounds, was tested at 396° C., 1000 pounds per square inch hydrogen pressure, and 2.0 liquid hourly space velocity in the vapor-phase desulfurization of a West Texas virgin heavy naphtha containing 0.355 percent by weight of sulfur. The treated naphtha was collected in two fractions, which were analyzed separately. The results are presented in the following table:

| Fraction | Product Yield, vol.-percent | Product S, wt.-percent | Desulfurization, percent |
|---|---|---|---|
| 1 | 28 | 0.073 | 80 |
| 2 | 60 | 0.069 | 81 |

Example 6

Orthophosphoric acid (130 grams), titanium tetrachloride (126 grams), and hydrous tungsten trioxide, $WO_3 \cdot H_2O$ (3 grams), were mixed, and it was observed that HCl was liberated and a fluffy, yellowish, solid mass was formed before heat was applied. The mixture was heated to a maximum of 80° C. for 18 hours, and the temperature was then raised over a period of 8 hours to 205° C. The reaction product was dried in a vacuum oven and formed into ⅛-inch pellets having a crushing strength of 6 to 8 pounds. The completed catalyst was tested in the vapor phase desulfurization of a West Texas virgin heavy naphtha containing 0.355 percent by weight of sulfur. The treated naphtha was collected in a plurality of fractions, which were analyzed separately. The test conditions and results are presented in the following table:

| Temp., °C. | Press., p. s. i. g. | Liquid Sp. Vel., hr.⁻¹ | Product Yield, vol.- percent | Product S, wt.- percent | Desulfurization, percent |
|---|---|---|---|---|---|
| 395 | 1,000 | 2.0 | 28 | 0.054 | 85 |
|  |  |  | 60 | 0.056 | 84 |
|  |  |  | 29 | 0.096 | 73 |
| 396 | 200 | 1.6 | 42 | 0.100 | 72 |
|  |  |  | 28 | 0.095 | 73 |

*Example 7*

Orthophosphoric acid (98 grams), titanium tetrachloride (95 grams), and vanadium pentoxide, $V_2O_5$ (2 grams), were mixed, heated, dried, pelleted, and tested as described in Example 6. The pellets had a crushing strength of 6 to 7 pounds. The results of the tests were as follows:

| Temp., °C. | Press., p. s. i. g. | Liquid Sp. Vel., hr.⁻¹ | Product Yield, vol.- percent | Product S, wt.- percent | Desulfurization, percent |
|---|---|---|---|---|---|
| 396 | 1,000 | 1.9 | 50 | 0.090 | 75 |
|  |  |  | 43 | 0.085 | 76 |
| 400 | 200 | 1.6 | 32 | 0.115 | 68 |
|  |  |  | 62 | 0.113 | 68 |

While the foregoing specific examples illustrate advantageous embodiments of our invention, it is to be understood that we are not limited thereto, but rather that the true scope of our invention is evidenced by the broad disclosure thereof and by the appended claims. In general it can be said that any modifications or equivalents of our invention that would ordinarily occur to one skilled in the art are to be considered as lying within the scope of our invention.

In accordance with the foregoing description, we claim as our invention:

1. A method for desulfurizing a sulfur-containing hydrocarbon stock which comprises contacting said stock at a temperature between about 200 and 500° C. and a liquid hourly space velocity between about 0.5 and 4 in the presence of a solid catalyst prepared by mixing a phosphoric acid selected from the group consisting of orthophosphoric and pyrophosphoric acids with a titanium halide selected from the group consisting of the chlorides and bromides of titanium in an atomic ratio of halogen to active hydrogen in said acid between about 0.4:1 and 1:1, and heating the resulting mixture at a temperature above about 175° C. until evolution of hydrogen halide therefrom substantially ceases.

2. A method for desulfurizing a sulfur-containing hydrocarbon stock which comprises contacting said stock with hydrogen at a temperature between about 200 and 500° C. and a liquid hourly space velocity between about 0.5 and 4 in the presence of a solid catalyst prepared by mixing titanium tetrachloride with substantially anhydrous orthophosphoric acid in a molar ratio between about 0.38:1 and 0.7:1, heating the resulting mixture to a temperature above about 175° C. to promote interaction of the components thereof with evolution of hydrogen chloride, and continuing said heating until said evolution of hydrogen chloride exceeds 3.5 moles per mole of titanium tetrachloride and substantially ceases.

3. A method for desulfurizing a sulfur-containing hydrocarbon stock which comprises contacting said stock with hydrogen at a temperature between about 200 and 500° C. and a liquid hourly space velocity between about 0.5 and 4 in the presence of a solid catalyst prepared by mixing a phosphoric acid selected from the group consisting of orthophosphoric and pyrophosphoric acids, a titanium halide selected from the group consisting of the chlorides and bromides of titanium in an atomic ratio of halogen to active hydrogen in said acid between about 0.4:1 and 1:1, and a promoter in a concentration between about 0.5 and 20 percent by weight based on said acid, said promoter being selected from the class consisting of group V and VI metallic oxides having hydrogenation-dehydrogenation properties and substances affording said oxides under the conditions employed in said catalyst preparation, and heating the resulting mixture at a temperature above about 175° C. until evolution of hydrogen halide therefrom substantially ceases.

4. A method for desulfurizing a sulfur-containing hydrocarbon stock which comprises contacting said stock with hydrogen at a temperature between about 200 and 500° C. and a liquid hourly space velocity between about 0.5 and 4 in the presence of a solid catalyst prepared by mixing a titanium chloride with orthophosphoric acid in an atomic ratio of chlorine to active hydrogen between about 0.4:1 and 1:1 and between about 0.5 and 20 percent by weight based on said acid of an oxide of a metal chosen from groups V and VI, said oxide having hydrogenation-dehydrogenation properties, and heating the resulting mixture at a temperature above about 175° C. until evolution of hydrogen chloride therefrom substantially ceases.

5. A method for desulfurizing a sulfur-containing hydrocarbon stock which comprises contacting said stock with hydrogen at a temperature between about 200 and 500° C. and a liquid hourly spaced velocity between about 0.5 and 4 in the presence of a solid catalyst prepared by mixing titanium tetrachloride with orthophosphoric acid in a molar ratio above about 0.38:1 and between about 0.5 and 20 percent by weight based on said acid of an oxide of a metal chosen from groups V and VI, said oxide having hydrogenation-dehydrogenation properties, heating the resulting mixture to promote interaction of the components thereof with evolution of hydrogen chloride, and continuing said heating until said evolution of hydrogen chloride exceeds 3.5 moles per mole of titanium tetrachloride and substantially ceases.

6. A method for desulfurizing a sulfur-containing hydrocarbon stock which comprises contacting said stock at a temperature between about 200 and 500° C., a hydrogen pressure up to about 1500 pounds per square inch, and a liquid hourly space velocity between about 0.5 and 4 in the presence of a solid catalyst prepared by mixing titanium tetrachloride with substantially anhydrous orthophosphoric acid in a molar ratio between about 0.38:1 and 0.7:1 and between about 1 and 5 percent by weight based on said acid of an oxide of a metal chosen from groups V and VI, said oxide having hydrogenation-dehydrogenation properties, heating the resulting mixture to a temperature above about 175° C. to promote interaction of the components thereof with evolution of hydrogen chloride, and continuing said heating until said evolution of hydrogen chloride exceeds 3.5 moles per mole of titanium tetrachloride and substantially ceases.

7. A method for desulfurizing a sulfur-containing petroleum fraction which comprises contacting said fraction at a temperature between about 300 and 500° C., a hydrogen pressure between about 200 and 1000 pounds per square inch, and a liquid hourly space velocity between about 0.5 and 4 in the presence of a solid catalyst prepared by mixing orthophosphoric acid, between about 1 and 5 percent by weight of chromia based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

8. A method for desulfurizing a sulfur-containing petroleum fraction which comprises contacting said fraction at a temperature between about 200 and 500° C., a hydrogen pressure between about 200 and 1000 pounds per square inch, and a liquid hourly space velocity between about 0.5 and 4 in the presence of a solid catalyst prepared by mixing orthophosphoric acid, between about 1 and 5 percent by weight of an oxide of molybdenum based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

9. A method for desulfurizing a sulfur-containing petroleum fraction which comprises contacting said fraction at a temperature between about 200 and 500° C., a hydrogen pressure between about 200 and 1000 pounds per square inch, and a liquid hourly space velocity between about 0.5 and 4 in the presence of a solid catalyst prepared by mixing orthophosphoric acid, between about 1 and 5 percent by weight of tungsten oxide based on said acid, and between about 0.38 and 0.7 mole of titanium tetrachloride per mole of said acid, and heating the resulting mixture to a temperature between about 175 and 250° C. until the evolution of hydrogen chloride therefrom exceeds 3.5 moles per mole of titanium tetrachloride and substantially ceases.

10. The process of claim 4 wherein said oxide is vanadium oxide.

References Cited in the file of this patent

UNITED STATES PATENTS

| | | |
|---|---|---|
| 1,969,302 | Egloff et al. | Aug. 7, 1934 |
| 1,988,083 | Morell | Jan. 15, 1935 |